No. 738,258. PATENTED SEPT. 8, 1903.
J. M. TYLER.
BURGLAR TRAP.
APPLICATION FILED DEC. 16, 1902.
NO MODEL.
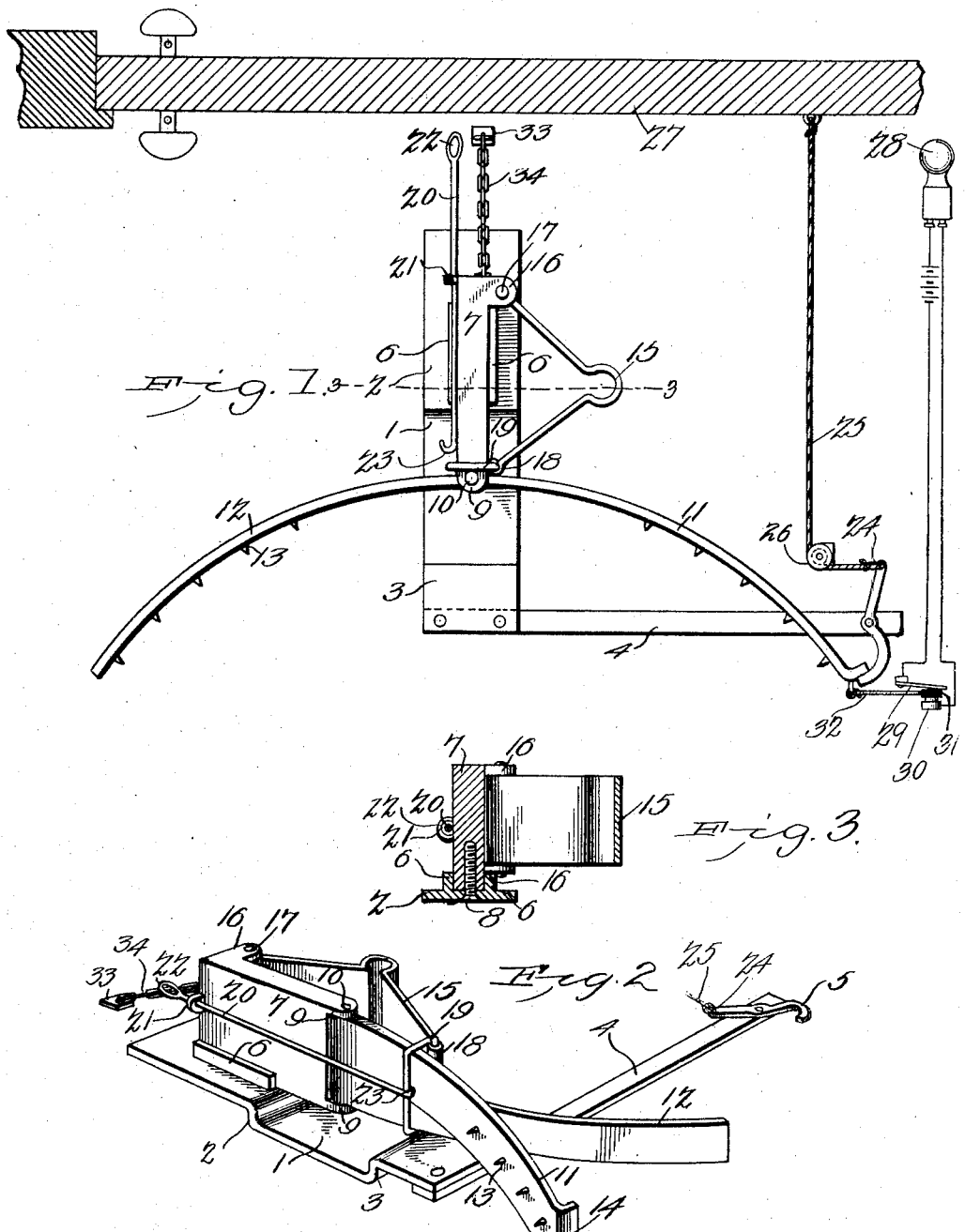
Witnesses
James M. Tyler, Inventor.
by C. A. Snow & Co.
Attorneys No. 738,258. Patented September 8, 1903.

UNITED STATES PATENT OFFICE.

JAMES M. TYLER, OF BAY ST. LOUIS, MISSISSIPPI.

BURGLAR-TRAP.

SPECIFICATION forming part of Letters Patent No. 738,258, dated September 8, 1903.

Application filed December 16, 1902. Serial No. 135,429. (No model.)

*To all whom it may concern:*

Be it known that I, JAMES M. TYLER, a citizen of the United States, residing at Bay St. Louis, in the county of Hancock and State of Mississippi, have invented a new and useful Burglar-Trap, of which the following is a specification.

My invention relates to certain improvements in burglar and animal traps of that general class shown in United States Letters Patent granted to me on the 23d day of July, 1901, under No. 679,196.

One object of the invention is to improve, simplify, and cheapen the construction of the trap and to strengthen the trap by the employment of an auxiliary spring to assist in the movement of the jaws to the closed position.

A further object of the invention is to provide means for retracting the spring after the jaws have been sprung, thereby permitting them to be reset without danger to the operator.

With these and other objects in view my invention consists in the construction and novel combination and arrangement of parts, hereinafter fully described, illustrated in the accompanying drawings, and pointed out in the claims hereto appended.

In the drawings, Figure 1 is a plan view showing the trap as set, a portion of the door to which it is attached being also shown and the connections with an electrically-operated alarm being illustrated. Fig. 2 is a perspective view showing the trap sprung. Fig. 3 is a transverse section on the line 3 3 of Fig. 1.

Similar numerals of reference indicate corresponding parts in all the figures of the drawings.

1 indicates a base-plate made of sheet metal or other suitable material, having offsets 2 and 3 formed therein. Rigidly secured to the end of the base-plate 1 and in the recess formed by the offset 3 is a trigger-bar 4, extending substantially at right angles to the base-plate and having a trigger 5 pivotally mounted thereon at a point adjacent its free end.

The base-plate 1 is provided with parallel upwardly-extending ribs or flanges 6, adapted to receive a supporting plate or block 7, which is secured therein in any suitable manner, as by screws 8. The block 7 is substantially rectangular in shape and is provided with longitudinally-extending lugs or ears 9, between which are pivoted, by means of a rod 10, two oppositely-disposed jaws 11 and 12. The jaws 11 and 12 are provided with a series of inwardly-extending teeth or spurs 13, and one jaw, 11, has its outer end bent to form a hook 14, adapted to engage the trigger 5 when the trap is set.

15 is a V-shaped spring, one end of which is secured between the laterally-extending ears 16 on the block 7 by means of a pin 17 and the other end provided with an eye 18, through which passes a loop 19. The loop 19 embraces the block 7 when jaws are in the set position and when the trap is sprung slides freely over the jaws 11 and 12, forcing them in opposite directions to the closed position. As a means for retracting the spring 15 so as to allow the trap to be reset I provide a rod 20, which is slidably mounted in bearings 21 on the rear end of the block 7 and is provided with a handle 22 and a hook end 23, adapted to engage the loop 19.

The trigger 5 is provided with an aperture 24, to which is attached a cord 25, which passes through suitable guides 26 to a door 27, so that when the door is opened the cord will be pulled to operate the trigger and spring the trap.

An alarm is set off when the trap is sprung and consists of an electric bell 28 and a battery with which it is in circuit, one terminal of the circuit being connected to a spring-finger 29 and the other terminal to a contact 30, disposed therebelow for engagement thereby to close the engaging circuit through the bell. An insulating-plate 31 is provided and is disposed between the spring-finger and the contact, and attached to this insulating-plate is a cord 32, which is attached also to the end of the jaw 11, so that when the trap is sprung the movement of the jaw 11 will withdraw the insulating-plate from between the finger and the contact to permit the engagement thereof to close the circuit.

The trap may be secured to a post 33 by means of a chain 34, fastened to the block 7.

The operation of my device is as follows: The trap is placed in position in front of the door with the base-plate resting on the ground or other support, being secured to the post 33 by means of the chain 34, and should a burglar attempt to open the door the pull on the cord 25 will release the trigger 5, thereby permitting the loop 19, carried by the spring 15, to slide over the jaws 11 and 12, forcing them together and causing the teeth to engage the clothing of the burglar and prevent him from slipping out from between the jaws, and at the same time the insulating-plate is withdrawn, closing the circuit and sounding the alarm. When it is desired to reset the trap, the hooked end of the rod 20 is brought into engagement with the loop 19 and drawn backward, thereby retracting the spring and permitting the jaws to be reset, after which the hook is disengaged from the loop.

Various changes in form, proportion, and minor details of construction may be resorted to without departing from the principle or sacrificing any of the advantages of the invention.

Having thus described the invention, what I claim is—

1. A trap comprising a frame, a pair of jaws pivoted thereon, a spring secured to the frame and adapted to engage the jaws, and means carried by the base and normally disconnected from the spring for retracting the spring, whereby the jaws may be reset.

2. A trap comprising a frame, a pair of oppositely-disposed jaws pivoted thereon, a spring, one end of which is secured to the frame and the other end thereof provided with a pivoted loop adapted to encircle the jaws when the trap is sprung.

3. A trap comprising a frame, a pair of jaws pivoted thereto, a spring, one end of which is secured to the frame and the other end thereof provided with a loop adapted to engage the jaws, a rod slidably mounted on the frame and adapted to engage the loop and retract the spring whereby the jaws may be reset.

4. A trap comprising a frame, a pair of superimposed oppositely-disposed jaws, pivoted to the frame, a trigger, a spring carried by the frame and having a pivoted loop adapted to engage the jaws, and means for retracting the spring whereby the jaws may be reset.

5. A trap comprising a base, upwardly-extending flanges thereon, a supporting-plate mounted between the flanges, a pair of jaws pivoted to the supporting-plate, a spring having one end secured to the supporting-plate and provided at its opposite end with a loop adapted to engage the jaws when the trap is sprung, and means for retracting the spring to permit the resetting of the jaws.

6. A trap comprising a base, a trigger pivoted thereto, a supporting-plate mounted on the base, a pair of jaws pivoted to the supporting-plate, a spring having one end secured to the supporting-plate and provided at its opposite end with a loop adapted to engage the jaws, one of said jaws having a hooked end portion adapted to engage the trigger, an alarm mechanism connected with the jaws, and means operated by the closing movement of the trap for sounding the alarm.

In testimony that I claim the foregoing as my own I have hereto affixed my signature in the presence of two witnesses.

JAMES M. TYLER.

Witnesses:
W. W. STOCKSTILL,
G. W. MAYNARD, Jr.